US006865154B1

United States Patent
Charny et al.

(10) Patent No.: US 6,865,154 B1
(45) Date of Patent: Mar. 8, 2005

(54) METHOD AND APPARATUS FOR PROVIDING BANDWIDTH AND DELAY GUARANTEES IN COMBINED INPUT-OUTPUT BUFFERED CROSSBAR SWITCHES THAT IMPLEMENT WORK-CONSERVING ARBITRATION ALGORITHMS

(75) Inventors: Anna Charny, Sudbury, MA (US); Pattabhiraman Krishna, Marlboro, MA (US); Naimish Patel, North Andover, MA (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 09/257,725

(22) Filed: Feb. 25, 1999

Related U.S. Application Data

(63) Continuation-in-part of application No. 09/021,245, filed on Feb. 10, 1998, now Pat. No. 6,563,837, which is a continuation-in-part of application No. 09/005,740, filed on Jan. 12, 1998, and a continuation-in-part of application No. 09/005,738, filed on Jan. 12, 1998, now Pat. No. 6,072,772.

(51) Int. Cl.[7] .......................... H04L 12/26; H04L 12/16
(52) U.S. Cl. ...................... 370/235; 370/229; 370/230; 370/230.1; 709/230; 709/231; 709/232
(58) Field of Search .................... 370/229, 230, 370/230.1, 235; 709/230, 231, 232

(56) References Cited

U.S. PATENT DOCUMENTS

| | | | |
|---|---|---|---|
| 4,823,338 A | 4/1989 | Chun et al. |
| 4,845,710 A | 7/1989 | Nakamura et al. |
| 4,933,937 A | 6/1990 | Konishi |
| 5,018,133 A | 5/1991 | Tsukakoshi et al. |
| 5,138,615 A | 8/1992 | Lamport et al. |

(List continued on next page.)

FOREIGN PATENT DOCUMENTS

| | | |
|---|---|---|
| EP | 0 404 337 | 12/1990 |
| EP | 0 817 436 A | 1/1998 |
| GB | 2 293 720 | 4/1996 |
| WO | WO 96/08899 | 3/1996 |
| WO | WO 97 31460 A | 8/1997 |

OTHER PUBLICATIONS

"Draft Standard P802.10/D7" IEEE Standards for Local and Metropolitan Area Network: Virtual Bridged Local Area Networks, Oct. 3, 1997, XP002103631.

Anderson T., Owicki S., Saxe J., Thacker C., "High Speed Switch Scheduling for Local Area Networks", Proc. Fifth Internt. Conf. on Architectural Support for Programming Languages and Operating Systems, Oct. 1992, pp. 98–110.

Bennett J. and Zhang H., "WF2Q—Worst–case Fair Weighted Fair Queuing", Proc. IEEE INFOCOM '96.

Chang C–Y et al.: "A Broadband Packet Switch Architecture with Input and Output Queuing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Charny A., "Hierarchical Relative Error Scheduler: An Efficient Traffic Shaper for Packet Switching Networks," Proc. NOSSDAV '97, May 1997, pp. 283–294.

(List continued on next page.)

Primary Examiner—Hassan Kizou
Assistant Examiner—Joe Logsdon
(74) Attorney, Agent, or Firm—Lahive & Cockfield, LLP

(57) ABSTRACT

A system is described where delay and bandwidth guarantees are implemented with a crossbar switch. A rate controller is provided as a front-end to a crossbar switch with an arbiter running a work-conserving arbitration algorithm. The system provides bandwidth and delay guarantees to all properly behaving flows independently of improperly behaving flows.

48 Claims, 3 Drawing Sheets

U.S. PATENT DOCUMENTS

| | | | |
|---|---|---|---|
| 5,237,661 A | 8/1993 | Kawamura et al. | |
| 5,321,693 A | 6/1994 | Perlman | |
| 5,367,520 A | 11/1994 | Cordell | |
| 5,394,402 A | 2/1995 | Ross | |
| 5,473,599 A | 12/1995 | Li et al. | |
| 5,493,566 A | 2/1996 | Ljungberg et al. | |
| 5,500,858 A | 3/1996 | McKeown | |
| 5,517,495 A | 5/1996 | Lund et al. | |
| 5,550,823 A | 8/1996 | Irie et al. | |
| 5,594,732 A | 1/1997 | Bell et al. | |
| 5,617,421 A | 4/1997 | Chin et al. | |
| 5,619,495 A | 4/1997 | Yamanaka et al. | |
| 5,621,734 A | 4/1997 | Mann et al. | |
| 5,636,215 A | 6/1997 | Kubo et al. | |
| 5,689,644 A | 11/1997 | Chou et al. | |
| 5,734,865 A | 3/1998 | Yu | |
| 5,737,528 A * | 4/1998 | Konishi | 395/200.12 |
| 5,768,257 A | 6/1998 | Khacherian et al. | |
| 5,774,453 A | 6/1998 | Fukano et al. | |
| 5,805,816 A | 9/1998 | Picazo, Jr. et al. | |
| 5,808,056 A | 9/1998 | Amato et al. | |
| 5,838,677 A | 11/1998 | Kozaki et al. | |
| 5,859,835 A * | 1/1999 | Varma et al. | 370/229 |
| 5,892,922 A | 4/1999 | Lorenz | |
| 5,959,991 A | 9/1999 | Hatono et al. | |
| 5,978,359 A | 11/1999 | Caldara et al. | |
| 5,982,771 A | 11/1999 | Caldara et al. | |
| 5,982,776 A | 11/1999 | Manning et al. | |
| 5,996,019 A | 11/1999 | Hauser et al. | |
| 6,052,376 A | 4/2000 | Wills | |
| 6,122,251 A | 9/2000 | Shinohara | |
| 6,122,252 A | 9/2000 | Aimoto et al. | |
| 6,134,217 A * | 10/2000 | Stiliadis et al. | 370/232 |
| 6,144,635 A | 11/2000 | Nakagawa | |
| 6,188,690 B1 * | 2/2001 | Holden et al. | 370/390 |
| 6,324,165 B1 * | 11/2001 | Fan et al. | 370/232 |
| 6,345,050 B1 * | 2/2002 | Alleyne et al. | 370/389 |
| 6,377,583 B1 | 4/2002 | Lyles et al. | |

OTHER PUBLICATIONS

Guerin R. and Sivarajan K., "Delay and Throughput Performance of Speeded–up Input–Queuing Packet Switches," IBM Research Report RC 20892, Jun. 1997.

Liu N. H. et al., "A New Packet Scheduling Algorithm for Input–Buffered Multicast Packet Switches" IEEE Global Telecommunications Conference, Phoenix, Arizona, Nov. 3–8, 1997, vol. 3, Nov. 3, 1997, pp. 1695–1699, XP000737812 Institute of Electrical and Electronics Engineers.

Mark B. L. et al; "Large Capacity Multiclass ATM Core Switch Architecture" ISS '97, World Telecommunications Congress, (International Switching Symposium), Global Network Evolution: Convergence or Collission? Toronto, Sep. 21–26, 1997, vol. 1, Sep. 21, 1997, pp. 417–423 XP0000720547.

McKeown N., "Scheduling Algorithms for Input–Queued Cell Switches," Ph.D. Thesis, Univ. of California, Berkeley, May 1995.

McKeown N., Anatharam V, and Warland J., "Achieving 100% Throughput in an Input–Queued Switch," Proc. IEEE INFOCOM '96, Mar. 1996, pp. 296–302.

McKeown N., Izzard M., Mekkittikul A., Ellersick W. and Horowitz M., "The Tiny Tera: A Packet Switch Core."

McKeown N., Prabahakar B., and Zhu M., "Matching Output Queuing with Combined Input and Output Queuing," Proc. 35th Annual Allerton Conference on Communications, Control, and Computing, Monticello, Illinois, Oct. 1997.

Parekh, A., "A Generalized Processor Sharing Approach to Flow Control in Integrated Services Networks", MIT, Ph.D. dissertation, Jun. 1994.

Prabhakar B. and McKeown N., "On the Speedup Required for Combined Input and Output Queued Switching," Computer Systems Lab. Technical Report CSL–TR–97–738, Stanford University.

Prabhakar B. et al.: "Multicast Scheduling for Input–Queued Switches" IEEE Journal on Selected Areas in Communications, vol. 15, No. 5, Jun. 1, 1997, pp. 855–866, XP000657038 see paragraph 1.

Stiliadis D. and Varma A., "Providing Bandwidth Guarantees in an Input–Buffered Crossbar Switch," Proc. IEEE INFOCOM '95, Apr. 1995, pp. 960–968.

Stiliadis D. and Varma, A., "Frame–Based Fair Queuing: A New Traffic Scheduling Algorithm for Packet Switch Networks", Proc. IEEE INFOCOM '96.

Zhang L., "A New Architecture for Packet Switched Network Protocols," Massachusetts Institute of Technology, Ph.D. Dissertation, Jul. 1989.

* cited by examiner

METHOD AND APPARATUS FOR PROVIDING BANDWIDTH AND DELAY GUARANTEES IN COMBINED INPUT-OUTPUT BUFFERED CROSSBAR SWITCHES THAT IMPLEMENT WORK-CONSERVING ARBITRATION ALGORITHMS

CROSS-REFERENCE TO RELATED APPLICATIONS

This is a continuation-in-part-application of the following co-pending U.S. patent applications:

Ser. No. 09/021,245, filed Feb. 10, 1998, now U.S. Pat. No. 6,563,837, issued May 13, 2003, by Pattabhiraman Krishna, Anna Charny, Naimish Patel and Robert J. Simcoe, entitled "Method and Apparatus for Providing Work-Conserving Properties in a Non-blocking Switch with Limited Speedup Independent of Switch Size,"

Ser. No. 09/005,740, filed Jan. 12, 1998 by Pattabhiraman Krishna, Anna Charny, Naimish Patel and Robert J. Simcoe, entitled "Method for Providing Delays Independent of Switch Size in a Crossbar Switch with Speedup," and Ser. No. 09/005,738, filed Jan. 12, 1998, now U.S. Pat. No. 6,072,772, issued on Jun. 6, 2000, by Pattabhiraman Krishna, Anna Charny, Naimish Patel and Robert J. Simcoe, entitled "Method for Providing Bandwidth and Delay Guarantees in a Crossbar Switch with Speedup."

BACKGROUND OF THE INVENTION

1. Field of the Invention

The present invention is related to providing bandwidth and deterministic delay guarantees for data flows in a communications network. More particularly, the bandwidth and deterministic delay guarantees are provided in a crossbar switch.

2. Description of the Related Art

Digital Communications Systems

In digital communications systems, data is routinely transmitted between many processing devices over some sort of network. For example, in computer networks, data is typically sent from one computer to another computer through network communications devices such as hubs, routers, bridges and/or switches interconnected by transmission media or data links. Viewed from the outside, the network communications devices have input and output ports that send and receive data to and from the data links. Within a single network device, data is accepted at input ports, transferred across a switching fabric internal to the network device, and received at output ports for transmission onto the next data link.

There are generally four classes of data switching architectures implemented in network communication devices and these are classified based on the location of the buffers. These four main data switching architectures are classified as either output-buffered (OB), shared memory, input-buffered (IB), or as combined input-output buffered (CIOB) network devices.

In output-buffered and shared memory network devices, packets arriving at an input port are placed into an output buffer corresponding to an output port determined by an address of the packet. In the output-buffered switch, the buffers are allocated at the output port proper, whereas in the shared memory switch, the buffers are allocated in the switch fabric Advantageously, output-buffered and shared memory network devices can use up to the full bandwidth of outbound data links because of the immediate forwarding of packets into output buffers. The packets are fed to the output data links as fast as the links can accept the packets. Also, output-buffered and shared memory network devices are typically considered very well suited for providing near-optimal throughput and delay performance.

A disadvantage of output-buffered and shared memory network devices is that when the switch size and link speeds increase, the switch fabric speed must increase proportionally in order to handle the combined data rates of all input ports being switched to a single output port. Also, memories used as output buffers to store packets must be very fast due to increased switch fabric speeds. Specifically, in both an output-buffered and shared memory network device having N input ports and receiving data at M bits per second, a data transmission rate of N * M is needed for the switch fabric to ensure that data is not lost. Similarly, the memory speed of the buffer system in both devices should also be as fast as N*M, since a buffer corresponding to an output port must be capable of accepting data from all inputs simultaneously. As the switch size and the link speeds increase, the cost of output-buffered and shared memory network devices also increases due to the costs inherent in the high speed memory requirements. Thus, current output-buffered and shared memory network devices are limited in size by memory, speed, technology and cost.

These issues have generated renewed interest in switches with lower cost, such as input-buffered switches. One of the most popular interconnection networks for building non-blocking input-buffered switches is the crossbar. An input-buffered crossbar with speedup of one has the crossbar fabric running at a speed equal to the link rate. This implies that in a crossbar switch with speedup of one, at most one packet can leave a given input port at a given time, and at most one packet can enter any output at any given time. All buffering in such a crossbar is located at the input ports of the switch. If each input port maintains a single FIFO queue, however, packets suffer from head of line (HOL) blocking. This limits the maximum throughput achievable. To eliminate HOL blocking, virtual output queues (VOQs) have been proposed. Inputs ports with VOQs have a bank of queues, with one queue per output port. Packets are stored in random access buffers at the input ports. In practice, however, only pointers to the data need to be stored in the respective VOQs.

Since there could be contention at the input and output ports if more than one input port has data for the same output port, there is a necessity for an arbitration algorithm to schedule packets between various input and output ports. A paper by N. McKeown, V. Anantharam and J. Warland, entitled "Achieving 100% Throughput in an Input-Queued Switch," Proc. INFOCOM, March 1996, pp. 296–302, showed that an input-buffered network device with VOQs supposedly can provide 100% throughput using a weighted maximum bipartite matching algorithm (defined therein). However, the complexity of the best known weighted maximum matching algorithm is too high for a high speed implementation.

Over the years, a number of maximal matching algorithms have been proposed. Details of these algorithms and the definition of maximal matching may be had with reference to the following papers: T. Anderson, S. Owicki, J. Saxe, C. Thacker, "High Speed Switch Scheduling for Local Area Networks," Proc. Fifth Intl. Conf. On Architectural Support for Programming Languages and Operating Systems, October 1992, pp. 98–110; and N. McKeown, "Scheduling Algorithms for Input-Queued Cell Switches," Ph.D. Thesis, Univ. of California, Berkeley, May 1995.

However, none of the disclosed algorithms matches the performance of an output-buffered network device.

Increasing the speedup of the switch fabric has also been proposed as one of the ways to improve the performance of an input-buffered switch. However, when the switch fabric has a higher bandwidth than the links, buffering is required at the output ports also. Thus, a combination input-buffered and output-buffered network device is required—a CIOB network device (Combined Input and Output Buffered). It has been shown that a CIOB switch is more suitable for providing throughput and delay guarantees than an input-buffered crossbar switch without speedup.

Integrated Services Networks

In the field of Integrated Services Networks, the importance of maintaining Quality of Service (QoS) guarantees for individual traffic streams (or flows) is generally recognized. Thus, such capability continues to be the subject of much research and development. Of particular interest for a system providing guaranteed flows are the guarantees associated with bandwidth and delay properties. These guarantees must be provided to all flows abiding by their service contract terms negotiated at connection setup, even in the presence of other misbehaving flows, i.e., those flows not abiding by their service contract terms.

Different methods have been developed to provide such guarantees in non-blocking switch architectures such as output-buffered or shared memory switches. Several algorithms providing a wide range of delay guarantees for non-blocking architectures have been disclosed in the literature. See, for example, A. Parekh, "A Generalized Processor Sharing Approach to Flow Control in Integrated Services Networks", MIT, Ph.D. dissertation, June 1994; J. Bennett and H. Zhang, "WF2Q—Worst-case Fair Weighted Fair Queuing", Proc. IEEE INFOCOM'96; D. Stiliadis and A. Varma, "Frame-Based Fair Queuing: A New Traffic Scheduling Algorithm for Packet Switch Networks", Proc. IEEE INFOCOM '96; L. Zhang, "A New Architecture for Packet Switched Network Protocols," Massachusetts Institute of Technology, Ph.D. Dissertation, July 1989; and A. Charny, "Hierarchical Relative Error Scheduler: An Efficient Traffic Shaper for Packet Switching Networks," Proc. NOSSDAV '97, May 1997, pp. 283–294.

Schedulers capable of providing bandwidth and delay guarantees in non-blocking architectures are commonly referred to as "QoS-capable schedulers".

Typically, as described above, output-buffered or shared memory non-blocking architectures require the existence of high-speed memory. For example, an output-buffered switch requires that the speed of the memory at each output must be equal to the total speed of all inputs. Unfortunately, the memory speed available with current technology has not kept pace with the rapid growth in demand for providing large-scale integrated services networks. Because there is a growing demand for large switches with total input capacity on the order of tens and hundreds of Gb/s, building an output-buffered switch at this speed has become a daunting task given the present state of memory technology. Similar issues arise with shared memory switches as well.

However, even given the work already done, providing bandwidth and delays in an input-queued crossbar switch remains a significant challenge.

N. McKeown, V. Anantharam and J. Warland, in "Achieving 100% Throughput in an Input-Queued Switch," cited above, describe several algorithms based on weighted maximum bipartite matching (defined therein) and which are supposedly capable of providing 100% throughput in an input-buffered switch. Unfortunately, the algorithms described there are too complex for real-time implementations and the nature of the delay guarantees provided by these algorithms remains largely unknown.

D. Stiliadis and A. Varma, "Providing Bandwidth Guarantees in an Input-Buffered Crossbar Switch," Proc. IEEE INFOCOM '95, April 1995, pp. 960–968, suggest that bandwidth guarantees in an input-buffered crossbar switch may be realized using an algorithm referred to as Weighted Probabilistic Iterative Matching (WPIM), which is essentially a weighted version of the algorithm described in Anderson et al. Although the WPIM algorithm is more suitable for hardware implementations than that described by McKeown et. al., it does not appear to provide bandwidth guarantees.

One known method of providing bandwidth and delay guarantees in an input-buffered crossbar architecture uses statically computed schedule tables, an example of which is described in Anderson et al. There are, however, several significant limitations associated with this approach. First, the computation of schedule tables is extremely complex and time-consuming. Therefore, it can only be performed at connection-setup time. Adding a new flow or changing the rates of the existing flows is quite difficult and time-consuming, since such modifications can require re-computation of the whole table. Without such re-computation, it is frequently impossible to provide delay and even bandwidth guarantees even for a feasible rate assignment. Consequently, these table updates tend to be performed less frequently than may be desired. Second, per-packet delay guarantees of the existing flows can be temporarily violated due to such re-computation. Third, there exists the necessity to constrain the supported rates to a rather coarse rate granularity and to restrict the smallest supported rate in order to limit the size of the schedule table. All of these limitations serve to substantially reduce the flexibility of providing QoS in this approach.

Therefore, at the current time no satisfactory method for providing flexible bandwidth and delay guarantees in a crossbar switch with speedup of one are known.

As mentioned above, recently a number of studies demonstrated that increasing the speedup factor in a crossbar switch (thus making it a CIOB switch) may allow providing better throughput and delay guarantees.

In one approach, several algorithms for the emulation of a non-blocking output-buffered switch by using an input-buffered crossbar with speedup independent of the size of the switch have been developed. Emulation of an output-buffered switch with a CIOB switch means that given identical input traffic patterns, the two switches produce identical output traffic patterns. The first such algorithm, called MUCFA for "Most Urgent Cell First Algorithm", which emulates an output-buffered switch with a single FIFO queue at the output, using a CIOB switch with speedup of four was described in B. Prabhakar and N. McKeown, "On the Speedup Required for Combined Input and Output Queued Switching," Computer Systems Lab. Technical Report CSL-TR-97-738, Stanford University. The MUCFA arbitration algorithm requires the assignment of priorities to cells as they enter the virtual output queues of input buffers at each input port. Generally, MUCFA selects the cells with the highest urgency, typically oldest, for connections to output ports first, hence the name "most urgent cell first". The MUCFA algorithm is difficult to implement in practice due to the maintenance required in assigning and updating the priorities of each cell queued at the input ports.

However, none of the algorithms, discussed above, that are emulating an output-buffered switch with FIFO at the output are capable of providing bandwidth and delay guarantees for flows abiding to their contracted bandwidth in the presence of misbehaved flows. This is due to the fact that the output-buffered switch with a FIFO at the output by itself is not capable of providing such guarantees. Hence, additional mechanisms are required to provide such guarantees.

One approach to achieve such guarantees is to attempt to emulate an output-buffered switch with some QoS-capable queuing and scheduling mechanism at the output ports with a CIOB switch. For example, as described above, an output-buffered switch with a WFQ scheduler at the output (and per-flow queues implied by the WFQ scheduler) is known to provide high-quality bandwidth and delay guarantees.

It was shown recently that it is theoretically possible to emulate an output-buffered switch with a broad class of schedulers at the output, including WFQ. This means that, in principle, it is possible to provide the same bandwidth and delay guarantees in a crossbar switch as in the output-buffered switches with a WFQ scheduler. Unfortunately, the algorithm described in this work is very complex and therefore is very difficult to implement in practice. No implementable algorithms achieving such emulation are currently known.

Another approach is to provide bandwidth and delay guarantees in a CIOB switch without emulating any output-buffered switch at all. Several implementable methods for providing bandwidth and delay guarantees in crossbar switches with speedup have been described. While these algorithms ensure bandwidth and delay guarantees, they do not have the work-conserving property, defined as follows: the switch is work-conserving if the output port is never idle when there is at least one packet in the switch destined to this output port. The work-conserving property is useful because it ensures that each output operates at its full capacity, and therefore no bandwidth is wasted. In particular, an output-buffered switch with a FIFO queue is work-conserving. This implies that any CIOB switch emulating an output-buffered switch is also work-conserving. It follows that MUCFA provides the work-conserving property.

Thus there is a need for simple work-conserving algorithms that will provide bandwidth and delay guarantees as well.

SUMMARY OF THE INVENTION

The present invention provides delay and bandwidth guarantees in a crossbar switch implementing a work-conserving arbitration algorithm. Bandwidth and delay guarantees are provided to all flows independently of the behavior of other flows. Specifically, the bandwidth and deterministic delay guarantees are provided to data flows abiding by pre-agreed rate agreements in the presence of misbehaving data flows, i.e., data flows not abiding by pre-agreed rate agreements.

In one embodiment, an apparatus provides bandwidth and delay guarantees in a crossbar switch. The apparatus comprises a rate controller to process received input cells; and an arbiter to schedule input cells output from the rate controller, the arbiter implementing a work-conserving algorithm. A work-conserving algorithm is defined as: when at least one input cell is available for arbitration to be sent to an output, a cell will be transmitted from said output.

BRIEF DESCRIPTION OF THE DRAWINGS

The above objects, features and advantages of the present invention will become more apparent from the following description of the embodiments of the present invention illustrated in the accompanying drawings, wherein.

DETAILED DESCRIPTION

The present invention provides a method for providing delay and bandwidth guarantees which can be overlayed on top of any arbitration algorithm having a work-conserving property to provide bandwidth and delay guarantees to all flows independently of the behavior of other flows. Since any switch that emulates an output-buffered switch with a FIFO at the output port is also work-conserving, the present invention can therefore be overlayed on top of any underlying work-conserving algorithm emulating such an output-buffered switch.

In one embodiment of the present invention, one such algorithm is the Lowest Occupancy Output First Algorithm (LOOFA). LOOFA is described in commonly-owned and co-pending U.S. patent application Ser. No. 09/021,245, filed Feb. 10, 1998, now U.S. Pat. No. 6,563,837, issued May 13, 2003, entitled "Method and Apparatus for Providing Work-Conserving Properties in a Non-blocking Switch with Limited Speedup Independent of Switch Size," the entire contents of which are hereby incorporated by reference. LOOFA emulates an output-buffered switch with speedup of three. Note that while emulation of an output-buffered switch implies the work-conservation property, the work-conservation property does not necessarily imply the emulation of an output-buffered switch property. For example, LOOFA is work-conserving with any speedup greater than or equal to two, but it emulates an output-buffered switch with a FIFO only with speedup greater than or equal to three.

As described, MUCFA with speedup of four emulates an output-buffered switch. Hence, MUCFA with speedup of four and LOOFA with speedup of two are both work-conserving.

All currently known implementable algorithms having the work-conserving property, e.g., LOOFA and MUCFA, do not provide bandwidth and delay guarantees. The present invention provides such guarantees while taking advantage of the work-conserving properties.

The present invention also overcomes a specific limitation of the known work-conserving arbitration algorithms such as MUCFA and LOOFA: these algorithms assume that only one cell at a time can arrive at the input of a single crossbar input port of the switch. This assumption is essential since, if it does not hold, a much higher speedup may be needed to achieve the work-conserving property or the property of emulating an output-buffered switch. However, in practice it is frequently the case that several lower-speed links are attached to the same crossbar input port (this is in fact the case for many commercially available crossbar switches). In that case, a cell can arrive at the same time on all of these links, violating the assumption of a single arriving cell. The current invention overcomes this difficulty.

Figure 1:
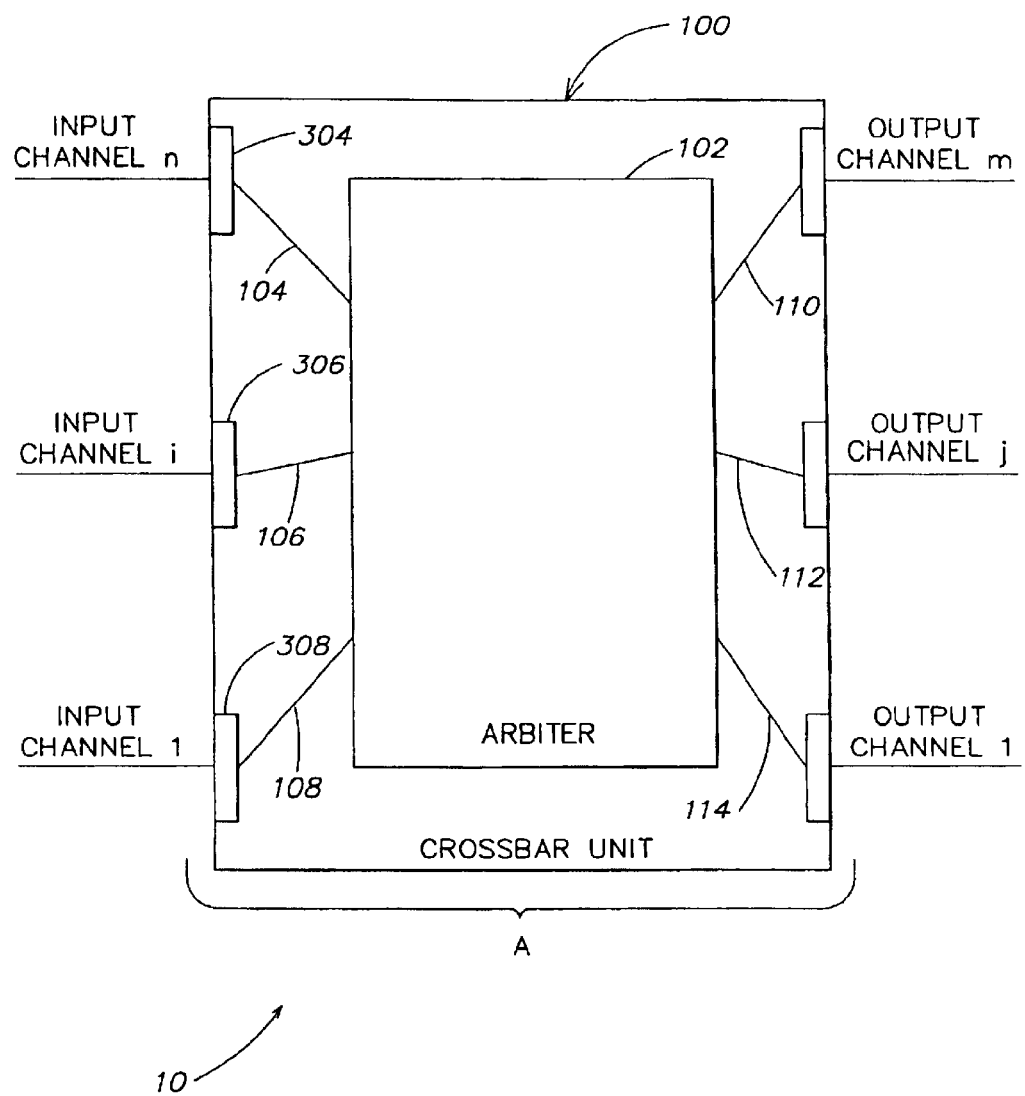
FIG. 1 is block diagram depicting a crossbar switch.

Referring to FIG. 1, with like reference numerals identifying like elements, there is shown a crossbar switch 10 employing some work-conserving arbitration algorithm. As illustrated in FIG. 1, the underlying architecture of the crossbar switch 10 is represented as an n×m crossbar. Here, "n", is the number of input channels i (1≦i≦n), of which only three are shown 104, 106, 108 and "m" is the number of output channels j (1≦j≦m) of which only three are shown 110, 112, 114, for simplicity.

The input channels are connected to the output channels by way of a crossbar unit 100. It will be understood by those skilled in the art that the crossbar unit 100 as depicted in FIG. 1 includes a crossbar switch fabric of known construction, the details of which have been omitted for purposes of simplification. It is the crossbar switch fabric that is responsible for transferring cells between input and output channels.

An arbiter 102 is also provided within the crossbar switch 10. The arbiter 102 implements an arbitration scheme that is work-conserving. As discussed above, an arbiter is work-conserving, if and only if an output port in such a network device is not idle when there is at least one cell at any input port of the network device destined for this output port. Accordingly, whenever a data cell is presented on an input channel i, destined for an output channel j, a data cell will be output from the output channel j. As schematically shown in FIG. 1, within the "bounds" of the crossbar unit 100, represented by A, the arbitration algorithm implemented by the arbiter 102 is work-conserving. An example of just such a work-conserving arbitration algorithm is found in the co-pending LOOFA application, discussed above. Of course, as has already been discussed, there are other work-conserving arbitration algorithms that are known.

Queuing and scheduling mechanisms 304, 306 and 308 are provided on each input channel of the crossbar unit 10. These mechanisms queue and schedule the data cells received at the corresponding input channels. The details of mechanisms 304, 306 and 308 depend on the particular arbitration algorithm implemented in the crossbar switch. It is well within the capacity of one of ordinary skill in the art to understand the mechanism implemented for a given arbitration algorithm such as LOOFA or MUCFA. For example, in the case of both LOOFA and MUCFA, the queuing structure at the input channel uses virtual queues.

Figure 2:
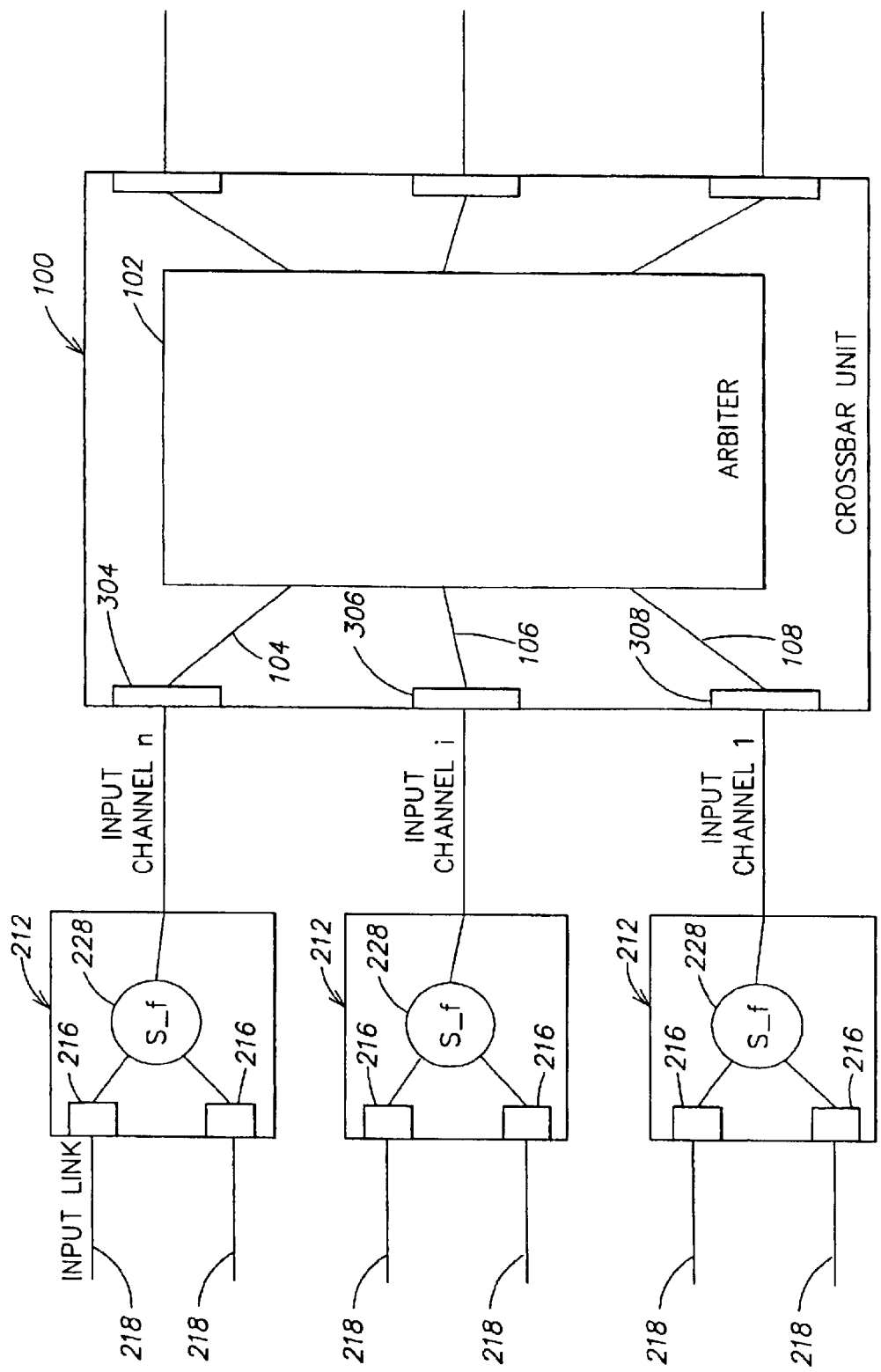
FIG. 2 is a block diagram of a switching system according to the present invention.

As shown in FIG. 2, one embodiment of the present invention includes a rate controller 212 on each input channel i. As can bee seen, the rate controller 212 includes multiple input ports 216 coupled to a respective input link of multiple input links 218. Upon arrival of a packet from the input link to the input channel, the packet is fragmented into cells. The outputs of the input ports 216 are connected to a single flow-level scheduler S_f 228, which schedules only a single flow at a time. Once scheduler S_f 228 schedules some flow f, it passes the cell at the head of this flow's queue to the respective queuing and scheduling mechanism 304, 306, 308.

Any QoS-capable scheduler can be used for the S_f scheduler. One such scheduler operates with a Rate-Controlled Smallest Eligible Finish Time First (RSEFTF) algorithm. The RSEFTF algorithm is disclosed in commonly-assigned and co-pending U.S. patent application Ser. No. 09/005,740, filed on Jan. 12, 1998 and entitled "Method for Providing Delays Independent of Switch Size in a Crossbar Switch with Speedup," which is hereby incorporated by reference in its entirety.

According to the present invention, a rate controller 212 is present in each input channel to process the data cells received on the input links on each input channel i. As shown in FIG. 2, a rate controller 212 receives the data cells on input links 218, processes the data cells according to the flow-level scheduler S_f 228 and passes them to the underlying work-conserving algorithm. As a result, one data cell per input channel at a time is provided to the arbiter for arbitration.

One of ordinary skill in the art will understand that although the rate controller is shown as being separate from the switch this is only done to show the concept that it is a "front end" for the input channel of the switch. Conceptually, the rate controller intercepts the input packets or data cells arriving at different ports, multiplexes them together and reshapes the traffic before passing it to the underlying arbitration algorithm. The structure as shown in FIG. 2 is one of explanation and the present invention is not to be limited thereto. One of ordinary skill in the art will understand that the physical location of the rate controller is irrelevant as long as its function is being implemented.

The present invention takes advantage of any work-conserving arbitration algorithm that operates on cells arriving at the switch. The arrival pattern of the incoming traffic is modified by passing it through the rate controller 212 at the input port of the switch. The purpose of the rate controller 212 is two-fold—first to provide isolation from misbehaving flows by ensuring that each flow is presented to the arbiter at the rate corresponding to the bandwidth guarantee expected by the flow, and second—to ensure that only a single cell is presented to the arbiter per cell time. Hence, the actual arrivals to the switch 100 are "pre-treated" prior to being handed to the underlying arbitration algorithm, e.g., LOOFA or MUCFA.

The rate controller can be organized in many different ways. A preferred architecture of such a rate controller, as described in U.S. patent application Ser. No. 09/005,740, works as follows. Upon arrival of a packet from the input link to the input channel, the packet is fragmented into cells and assigned to the per-flow queue corresponding to the flow the packet belongs to. Each per-flow queue is assigned a rate.

The delay-properties obtained by adding the rate controller to the underlying output-buffered switch emulation algorithm depend on the properties of the chosen QoS-capable scheduler. The best delay bounds can be shown for the RSEFTF algorithm discussed above.

Figure 3:
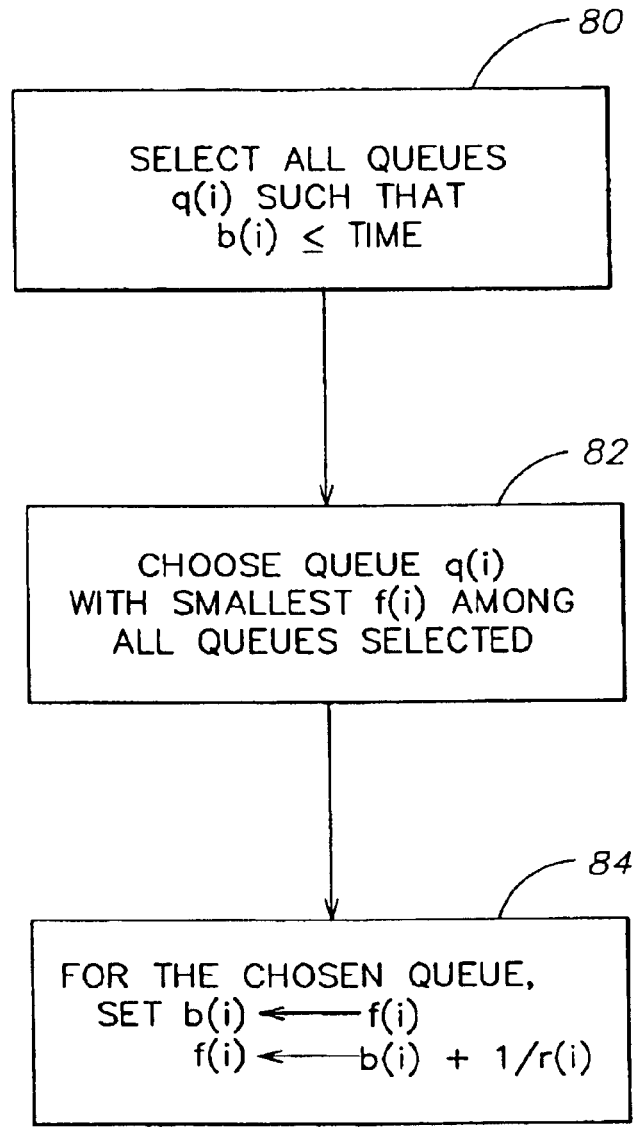
FIG. 3 is a flowchart showing operation of a rate controller.

Operation of the RSEFTF algorithm will now be described in conjunction with the flowchart of FIG. 3. RSEFTF assumes that data from each flow is placed in a per-flow queue. The per-flow queues, although not shown in FIG. 2, typically reside in the appropriate input port but may also reside in the central memory of the input channel. For each per-flow queue q(i) corresponding to flow i, the rate controller maintains two state variables: a first state variable b(i), which is the ideal beginning time of transmission of the next cell of this queue, and a second state variable f(i), which is the ideal finishing time of transmission of the next cell of this queue. Initially, $b(i)=0$ and $f(i)=1/r(i)$, where $r(i)$ is the rate assigned to flow i. As shown in step 80 of FIG. 3, the scheduler selects all queues at this input for which b(i) is less than or equal to the current channel cell slot time (channel clock counter time). Such queues are called eligible queues. In step 82, the scheduler then chooses as scheduled the queue q(i) with the smallest finish time f(i) from among the eligible queues. Ties are broken arbitrarily. The queue chosen in step 82 is the one whose index is sent to the arbiter 102. In step 84, the scheduler updates the state variables b(i) and f(i) corresponding to the chosen queue as follows: $b(i) \leftarrow f(i)$, and $f(i) \leftarrow (b(i)+1/r(i))$. The variables b(j) and f(j) for all j not equal to i, i.e., for the queues not chosen at the current cell slot, remain unchanged.

While the present invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the present invention described specifically herein. Such equivalents are intended to be encompassed in the scope of the claims.

What is claimed is:

1. An apparatus for providing bandwidth and delay guarantees in a crossbar switch including a crossbar unit, the apparatus comprising:
   a rate controller to receive cells at an input of the crossbar switch and process the received cells, including controlling a rate at which the received cells are provided to an input of the crossbar unit; and
   an arbiter to schedule sending the cells received at the input of the crossbar unit to an output of the crossbar switch, the arbiter implementing a work-conserving algorithm such that when at least one input cell is available for scheduling by the arbiter to be sent to an output of the crossbar switch, at least one cell will be transmitted from said output of the crossbar switch during a subsequent cell time.

2. The apparatus as recited in claim 1, wherein the rate controller processes received input cells such that only one cell is output from the rate controller to the arbiter at a time.

3. The apparatus as recited in claim 1, wherein the rate controller processes input cells received from a source such that a predetermined bandwidth rate for the source is not exceeded.

4. The apparatus as recited in claim 3, wherein the rate controller is implementing a Rate-Controlled Smallest Eligible Finish Time First (RSEFTF) algorithm.

5. The apparatus as recited in claim 1, wherein the arbiter is emulating an output-buffered switch with FIFO.

6. The apparatus as recited in claim 5, wherein the arbiter is running a Lowest Occupancy Output First Algorithm (LOOFA) algorithm with a speedup of at least three.

7. The apparatus as recited in claim 1, wherein the arbiter is running a Lowest Occupancy Output First Algorithm (LOOFA) algorithm with a speedup of at least two.

8. The apparatus as recited in claim 1, wherein the arbiter is running a Most Urgent Cell First Algorithm (MUCFA) algorithm with a speedup of four.

9. The apparatus of claim 1, wherein the rate controller arranges the received input cells into per-flow queues based on flows to which the received input cells belong.

10. The apparatus of claim 9, wherein the rate controller receives the received input cells on multiple inputs.

11. The apparatus of claim 9, wherein the rate controller isolates flows from misbehaving flows.

12. The apparatus of claim 9, wherein each flow has a respective bandwidth guarantee, and the rate controller presents each flow to the arbiter at a rate corresponding to the respective bandwidth guarantee of the flow.

13. The apparatus of claim 1, wherein the received input cells are fixed length cells.

14. The apparatus of claim 1, wherein the received input cells are ATM cells.

15. The apparatus of claim 1, wherein the rate controller comprises a scheduler.

16. The apparatus of claim 15, wherein the scheduler is QoS-capable.

17. The apparatus of claim 15, wherein the scheduler is implementing a Rate-Controlled Smallest Eligible Finish Timer First (RSEFTF) algorithm.

18. The apparatus of claim 1, wherein the rate controller processes received input cells received from an input link such that a predetermined bandwidth rate for the input link is not exceeded.

19. The apparatus of claim 1, wherein the rate controller fragments the received input cells into fragments.

20. The apparatus of claim 19, wherein the fragments are assigned to per-flow queues corresponding to flows to which the received input cells belong.

21. The apparatus of claim 1, further comprising output queues at said output.

22. The apparatus of claim 21, wherein the arbiter schedules input cells output from the rate controller based on an occupancy characteristic of the output queues.

23. A switch for providing bandwidth and delay guarantees to a data flow transmitted in a communications network, the data flow comprising at least one data cell, the switch comprising:
   a rate controller to receive the at least one data cell and to output the received at least one data cell at a predetermined rate for the respective data flow;
   a cross-bar unit to receive the at least one data cell output from the rate controller at an input of the cross-bar unit, the at least one data cell identifying an output of the switch;
   an arbiter, connected to the cross-bar unit, to control the connection of the at least one data cell, output from the rate controller, from the input of the cross-bar unit to the identified output of the switch according to a work-conserving algorithm;
   wherein the work-conserving algorithm requires that when at least one data cell is received by the cross-bar unit and is destined for an output, at least one data cell will be output from the identified output during a subsequent cell time.

24. The apparatus of claim 23, wherein the rate controller processes the at least one data cell such that only one cell is output from the rate controller to the arbiter at a time.

25. The apparatus of claim 23, wherein the rate controller processes input cells received from a known source such that a predetermined bandwidth rate for the known source is not exceeded.

26. The apparatus of claim 25, wherein the rate controller is implementing a Rate-Controlled Smallest Eligible Finish Time First (RSEFTF) algorithm.

27. The apparatus of claim 23, wherein the arbiter is emulating an output-buffered switch with FIFO.

28. The apparatus of claim 27, wherein the arbiter is running a Lowest Occupancy Output First Algorithm (LOOFA) algorithm with a speedup of at least three.

29. The apparatus of claim 23, wherein the arbiter is running a Lowest Occupancy Output First Algorithm (LOOFA) algorithm with a speedup of at least two.

30. The apparatus of claim 23, wherein the arbiter is running a Most Urgent Cell First Algorithm (MUCFA) algorithm with a speedup of at least three.

31. The apparatus of claim 23, wherein the rate controller arranges the at least one data cell into a per-flow queue based on a flow to which the at least one data cell belongs.

32. The apparatus of claim 31, wherein the rate controller receives the at least one data cell on one of multiple inputs.

33. The apparatus of claim 31, wherein the rate controller isolates the flow to which the at least one data cell belongs from misbehaving flows.

34. The apparatus of claim 31, wherein the flow to which the at least one data cell belongs has a bandwidth guarantee, and the rate controller presents the flow to which the at least one data cell belongs to the arbiter at a rate corresponding to the bandwidth guarantee of the flow.

35. The apparatus of claim 23, wherein the at least one data cell is a fixed length cell.

36. The apparatus of claim 23, wherein the at least one data cell are ATM cells.

37. The apparatus of claim 23, wherein the rate controller comprises a scheduler.

38. The apparatus of claim 37, wherein the scheduler is QoS-capable.

39. The apparatus of claim 37, wherein the scheduler is implementing a Rate-Controlled Smallest Eligible Finish Timer First (RSEFTF) algorithm.

40. The apparatus of claim 23, wherein the rate controller processes at least one data cell received from an input link such that a predetermined bandwidth rate for the input link is not exceeded.

41. The apparatus of claim 23, wherein the rate controller fragments the at least one data cell into fragments.

42. The apparatus of claim 41, wherein the fragments are assigned to a per-flow queue corresponding to a flow to which the at least one data cell belongs.

43. The apparatus of claim 23, further comprising output queues at the identified output.

44. The apparatus of claim 43, wherein the arbiter controls the connection of the at least one data cell to the identified output of the crossbar switch based on an occupancy characteristic of the output queues.

45. A method for transferring packets from input ports to output ports comprising:
   receiving packets at the input ports;
   fragmenting the packets into cells;
   arranging the cells into per-flow queues based on flows to which the packets belong;
   scheduling the cells for transfer according to a Rate-Controlled Eligible Finish Time First (RSEFTF) algorithm; and
   transferring the cells to the output ports according to a work-conserving algorithm.

46. The method of claim 45, wherein the act of transferring further comprises transferring according to a Lowest Occupancy Output First Algorithm (LOOFA).

47. The method of claim 45, wherein the act of transferring further comprises transferring according to a Most Urgent Cell First Algorithm (MUCFA).

48. The method of claim 45, wherein a work-conserving algorithm is defined as: when at least one input cell is available for arbitration to be sent to an output port, a cell will be transmitted from the output port.

* * * * *